United States Patent [19]

Barnes et al.

[11] Patent Number: 5,595,676
[45] Date of Patent: Jan. 21, 1997

[54] FLUORINATED POLYMERS

[75] Inventors: David J. Barnes, Tarporley, England; John P. Gilday, Linlithgow, Scotland

[73] Assignee: Imperial Chemical Industries PLC, United Kingdom

[21] Appl. No.: 356,386

[22] PCT Filed: Jul. 14, 1993

[86] PCT No.: PCT/GB93/01472

§ 371 Date: Dec. 22, 1994

§ 102(e) Date: Dec. 22, 1994

[87] PCT Pub. No.: WO94/03503

PCT Pub. Date: Feb. 17, 1994

[30]     Foreign Application Priority Data

Jul. 30, 1992 [GB] United Kingdom ............... 9216156
Jul. 30, 1992 [GB] United Kingdom ............... 9216157

[51] Int. Cl.⁶ .................................................. H01G 9/022
[52] U.S. Cl. ......................... 252/62.2; 252/500; 521/27; 521/28; 521/31; 429/27; 429/30; 429/33; 429/41; 429/46; 429/192; 429/199; 204/415; 204/421
[58] Field of Search ........................... 429/27, 30, 33, 429/41, 46, 192, 199; 204/415, 421; 521/27, 28, 31; 252/62.2, 500

[56]              References Cited

U.S. PATENT DOCUMENTS

| | | | |
|---|---|---|---|
| 3,282,875 | 11/1966 | Connolly et al. | 260/29.6 |
| 3,882,093 | 5/1975 | Cavanaugh et al. | 260/79.3 MU |
| 4,209,367 | 6/1980 | Seko et al. | 204/98 |
| 4,298,699 | 11/1981 | Asawa et al. | 521/31 |
| 4,358,545 | 11/1982 | Ezzell et al. | 521/27 |
| 4,487,668 | 12/1984 | England et al. | 204/98 |
| 4,508,603 | 4/1985 | Ukihashi et al. | 204/98 |
| 4,613,467 | 9/1986 | Kimoto et al. | 260/543 F |
| 4,940,525 | 7/1990 | Ezzell et al. | 204/252 |
| 5,001,163 | 3/1991 | Fielding et al. | 521/27 |
| 5,066,682 | 11/1991 | Miyazaki et al. | 521/27 |

FOREIGN PATENT DOCUMENTS

| | | |
|---|---|---|
| 0025644 | 8/1979 | European Pat. Off. |
| 0041733 | 6/1980 | European Pat. Off. |
| 0041735 | 6/1980 | European Pat. Off. |
| 0331321 | 3/1988 | European Pat. Off. |
| 0345964 | 6/1988 | European Pat. Off. |
| 52-33610 | 3/1977 | Japan . |
| 57-94003 | 6/1982 | Japan . |
| 60-250009 | 12/1985 | Japan . |
| 62-288617 | 12/1987 | Japan . |
| 1034197 | 9/1964 | United Kingdom . |
| 1518387 | 8/1976 | United Kingdom . |
| 1516048 | 9/1976 | United Kingdom . |

OTHER PUBLICATIONS

Eisman, Proceedings of Symposium on Diaphgragms, Separators and Ion Exchange Membranes, vol. 86–13, pp. 156–171, The Electrochemical Soc., Inc., Pennington, USA. No Month or Year Available.

Yeo, Journal of The Electrochemical Society, 1983, vol. 130(3), pp. 533–538. No Month Available.

Gierke et al., Journal of Polymer Science: Polymer Physics Edition, vol. 19, pp. 1687–1704 (1981). No Month Available.

Hashimoto et al., ACS Symposium Series 180, Edts Eisenburg et al., pp. 217–248 (1982). No Month Available.

Tant et al., ACS Symposium Series 394, Edts Utacki et al., pp. 370–400 (1984). No Month Available.

Naylor et al., Power Sources, vol. 13, pp. 253–261 (1991). No Month Available.

*Primary Examiner*—Bruce F. Bell

[57]              ABSTRACT

A fluoroorganic polymeric material which comprises a polymeric chain and at least one group pendent from the polymeric chain, in which the group pendent from the polymeric chain comprises at least one ion-exchange group or group convertible thereto, wherein the EW distribution is greater than 1.05, and wherein the ion-exchange group or group convertible thereto is preferably linked to the polymeric chain through an acyclic secondary carbon atom, for use as an ion-exchange membrane in an electrochemical device.

17 Claims, 2 Drawing Sheets

FLUORINATED POLYMERS

FIELD OF THE INVENTION

This invention relates to a fluoroorganic polymeric material, to an ion-exchange membrane prepared therefrom, particularly to an ion-exchange membrane which is useful in an electrochemical device, and to a method for the preparation thereof.

BACKGROUND OF THE INVENTION

Ion-exchange membranes made from fluoroorganic polymeric materials having ion-exchange properties are used in a wide variety of applications. Such polymeric materials and membranes may contain fixed anionic groups and associated cations and be capable of exchanging cations, or they may contain fixed cationic groups and associated anions and thus be capable of exchanging anions, or the polymeric materials and the membranes may contain both fixed anionic groups and fixed cationic groups.

Ion-exchange membranes which are essentially hydraulically impermeable but which are permeable to solvated cations or anions, or both, are finding increasing applications in electrochemical devices, for example in fuel cells, in electrolytic cells in which an electrolyte is electrolysed and in electrochemical cells in which electrosynthesis is carried out. In recent years a major development has been in the use of cation-exchange membranes in chlor-alkali cells in which chlorine and an aqueous metal hydroxide are produced by the electrolysis of aqueous alkali metal chloride solution.

Although many fluoroorganic polymeric materials have been proposed for use as membranes for such chlor-alkali cells, in recent years perfluoroorganic polymers containing ion-exchange groups, particularly fixed sulphonic and carboxylic groups, have found favour in chlor-alkali cells on account of the resistance of such perfluoroorganic polymers to chemical degradation in the cell.

As examples of such perfluoroorganic polymers containing ion-exchange groups may be mentioned inter alia the perfluoroorganic polymeric materials containing sulphonic groups described in GB patent 1034197 and the perfluoroorganic polymeric materials containing carboxylic groups described in GB patents 1516048 and 1518387.

Fluoroorganic polymeric materials comprising a copolymer derived from a substantially fluorinated alkene and a perfluorocarbon vinyl ether bearing an ion-exchange group or group convertible thereto are known, for example copolymers of tetrafluoroethylene (TFE) and a perfluorocarbon vinyl ether sulphonyl fluoride, eg $CF_2=CFOCF_2C(CF_3)FOCF_2CF_2SO_2F$ wherein the moiety $OCF_2C(CF_3)FOCF_2CF_2SO_2F$ forms a pendent group from the polymer backbone. Such copolymers, after appropriate hydrolysis of the sulphonyl group in the pendent group to the free sulphonic acid, have been suggested for use as inter alia ion-exchange membranes for use in, for example, diffusion dialysis, electrolytic cells and fuel cells.

Recently, it has been shown in U.S. Pat. No. 4,358,545 that an improved membrane for use as an ion-exchange membrane in a chlor-alkali cell can be obtained by using a fluoroorganic polymeric material comprising a copolymer as described above wherein the pendent group is relatively short, eg in a copolymer derived from TFE and $CF_2=CFOCF_2CF_2SO_2F$. It has been suggested that this improvement is the result of less water being absorbed per sulphonic group at a given concentration of functional group and allows the use of a polymer of lower equivalent weight (EW) in chlor-alkali cells.

More recently, U.S. Pat. No. 4,940,525 has confirmed the advantages of such copolymers with relatively short pendent groups and furthermore suggested that for certain applications, for example in fuel cells, eg so-called solid polymer electrolyte fuel cells (SPFC), such copolymers should have a low EW and a certain maximum Hydration Product.

"Hydration Product" is defined in U.S. Pat. No. 4,358,545 as the mathematical product of the hydration of the copolymer, expressed as moles of adsorbed water per functional group, and the EW weight of the copolymer.

In our EP 0,331,321 it has been shown that the ion-exchange group in a fluoroorganic polymeric material may be joined to the polymer backbone through a saturated cyclic group and that by suitable positioning of the ion-exchange group on the saturated cyclic group, and introduction of other substituents which are not ion-exchange groups onto the saturated cyclic group, the ion-exchange activity of the ion-exchange group may be varied. It has been shown, in particular, that it is possible to achieve a relatively high ion-exchange capacity in a fluoroorganic polymeric material which contains a relatively low proportion of units derived from the perfluorocarbon vinyl ether monomer disclosed therein.

In our EP 0,345,964 it has been shown that membranes prepared from homogeneous blends of organic polymeric material comprising a fluoropolymer containing ion-exchange groups and a fluoropolymer which is substantially free of ion-exchange groups, in defined ratio, are particularly effective in preventing hydraulic transfer of electrolyte between the anode compartments and the cathode compartments of an electrolytic cell in which the membrane is installed.

By homogeneous blend therein there is meant an intimate mixture such as may be formed, for example by melt-blending the fluoropolymers, that is by mixing the fluoropolymers at or above a temperature at which the fluoropolymers are in a fluid/molten state; or by blending the fluoropolymers in a solvent in which both fluoropolymers are soluble, and thereafter separating the blend of fluoropolymers from the solution; or by blending the polymers in the form of an emulsion of the polymers in a liquid medium and separating the homogeneous blend by coagulation. A homogeneous blend is not formed merely by forming a mixture of the solid polymers in particulate form.

SUMMARY OF THE INVENTION

We have now found surprisingly that an ion-exchange membrane prepared from a fluoroorganic polymeric material comprising a copolymer derived from a substantially fluorinated alkene and a perfluorocarbon vinyl ether bearing an ion-exchange group and wherein the EW distribution as hereinafter defined is more than 1.05 have a useful combination of properties, for example, higher specific conductivities over a commercially useful EW range, higher Hydration Products over a certain specific conductivity range and lower crystallinity.

Furthermore, we have found that such copolymers having an EW distribution of more than 1.05 can be prepared by controlling the rate of chemical addition of the substantially fluorinated alkene, eg TFE, to the reaction mixture such that the perfluorocarbon vinyl ether bearing the group convertible into an ion-exchange group is utilised at a high rate and a higher proportion of the perfluorocarbon vinyl ether present in the reaction mixture is used than in the conventional copolymerisation of such monomers.

DETAILED DESCRIPTION OF THE INVENTION

According to the first aspect of the present invention there is provided a fluoroorganic polymeric material which comprises a polymeric chain and least one group pendent from the polymeric chain in which the group pendent from the polymeric chain comprises at least one ion-exchange group or group convertible thereto wherein the EW distribution as hereinafter defined of the fluoroorganic polymeric material is greater than 1.05 and preferably is between 1.05 and 1.50.

By "EW distribution" we mean the ratio of the EW determined by titration:EW determined by Nuclear Magnetic Resonance (as hereinafter described in more detail).

According to the second aspect of the present invention there is provided a fluoroorganic polymeric material which comprises a polymeric chain and at least one group pendent from the polymeric chain, in which the group pendent from the polymeric chain comprises at least one ion-exchange group or group convertible thereto wherein the Conductivity Product thereof is at least 1.8 ohm$^{-1}$ cm$^{-1}$, preferably is at least 2.0 ohm$^{-1}$ cm$^{-1}$ and more preferably is greater than 4 ohm$^{-1}$ cm$^{-1}$.

Conductivity Product (CP) is defined by the equation:

$$CP = \text{specific conductivity} \times n^{1.5}$$

wherein n has the meaning hereinafter ascribed to

According to the third aspect of the present invention there is provided a fluoroorganic polymeric material which comprises a polymeric chain and at least one group pendent from the polymeric chain in which the group pendent from the polymeric chain comprises at least one ion-exchange group wherein the Relative Hydration Product thereof is less than 110. preferably is less than 70 and more preferably is between 40 and 65.

Relative Hydration Product (RHP) is defined by the equation:

$$RHP = (1 - Wa/Wu) \times n \times 100\%$$

wherein

Wa=% Uptake of electrolyte from 2.5M H$_2$SO$_4$;

Wu=% Uptake of electrolyte (water) from water; and n=the number of repeating units derived from the substantially fluorinated alkene, eg TFE, per repeating unit derived from a fluorinated vinyl ether bearing an ion-exchange group (as is hereinafter more fully explained with reference to General Structure IV.)

% Uptake of electrolyte can be determined by the method described in Elsman, "Proceedings of Symposium on Diaphragms, Separators and Ion Exchange Membranes", Vol 86-13, The Electrochemical Soc. Inc., Pennington, USA.

Preferably the fluoroorganic polymeric material according to the first aspect of the present invention has a Conductivity Product of greater than 4 ohm$^{-1}$ cm$^{-1}$ and/or a Relative Hydration Product of less than 70.

In the aforementioned aspects of the present invention, the ion-exchange group may be an anionic exchange group, ie the ionic group fixed covalently to the pendent group carbon atom may be inter alia —N(Alk)$_3^+$ Hal$^+$, where Hal is halogen. Preferably, however the ion-exchange group is a cation-exchange group, ie it is a fixed anionic group bearing a negative charge.

By "fixed anionic group" we mean that the anionic group is covalently bonded to a carbon atom in the pendent group. It will be appreciated that there will be an associated cation eg H$^+$, alkali metal, substituted or non-substituted ammonium.

As examples of fixed anionic troops may be mentioned inter alia carboxylic, phosphonic or preferably sulphonic acid groups.

As examples of types of fluorganic polymeric materials which may be prepared with an EW distribution of more than 1.05 by the process of the present invention, and/or by the blending method as herein described, may be mentioned inter alia those disclosed in U.S. Pat. Nos. 4,358,545, 4,940,525, 5,001,016, and 4,613,467. The disclosures in which patents are incorporated herein by way of reference.

It is preferred that the fluoroorganic polymeric material according to the present invention is a perfluoroorganic polymeric material.

By "perfluoroorganic" we mean a compound or polymer which is completely fluorinated such that it is free of hydrogen atoms attached to carbon atoms.

Preferably, however, the fluoroorganic polymeric materials according to the first, second or third aspects of the present invention are examples of the novel and inventive polymer structure which comprises a polymeric chain and at least one group pendent from the polymeric chain in which the group pendent from the polymeric chain comprises at least one ion-exchange group or group convertible thereto and an acyclic secondary carbon atom, and in which the ion-exchange group or group convertible thereto is directly linked to the acyclic secondary carbon atom.

According to a further aspect of the present invention there is provided a fluoroorganic polymeric material which comprises a polymeric chain and at least one group pendent from the polymeric chain, in which the group pendent from the polymeric chain comprises at least one ion-exchange group or group convertible thereto and an acyclic secondary carbon atom, and in which the ion-exchange group or group convertible thereto is directly linked to the acyclic secondary carbon atom.

More preferably the fluoroorganic polymeric material according to the present invention comprises a polymeric chain of repeating units having the structure

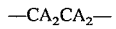

and repeating units having the structure

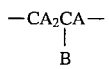

wherein

A, each of which may be the same or different, is halogen or an alkyl group bearing halogen substituents; and B is a group which comprises an acyclic secondary carbon and an ion-exchange group or group convertible thereto, and in which the ion-exchange group or group convertible thereto is directly linked to the acyclic secondary carbon atom.

By "secondary carbon atom" we mean that the carbon atom has two carbon atoms, as well as the cation-exchange group, attached directly to it.

Group B preferably has the General Structure I $$-D-OCF_2CFSO_2Z \quad \overset{Y}{|} \qquad I$$

wherein

D is a direct link or a divalent group;

Y is an at least substantially fluorinated alkyl group having up to 10 carbon atoms; and Z is fluorine, chlorine, a hydroxyl group, or a group having the formula —O—Met, where Met is an alkali metal, a substituted or unsubstituted ammonium group, or an alkyl group.

Where D is a divalent group it has the General Structure II $$-(-OCF_2CFX)_m- \qquad II$$

wherein

X, which in the same pendent group of General Structure IX (when m is 2 or more) or in different pendent groups may be the same or different, is F or Y; and m is 0–5.

In General Structures I and II:

X is preferably a perfluoroalkyl group having up to 10 carbon atoms, more preferably a perfluoroalkyl group having up to 5 carbon atoms and particularly more preferably is $CF_3$;

Y is preferably a perfluoroalkyl group having up to 5 carbon atoms, and more preferably is $CF_3$;

X and Y are preferably the same, more preferably —$CF_3$; and m is preferably between 1 and 3, and more preferably is 1.

As an example of a specific fluoroorganic polymeric material that we have prepared and investigated may be mentioned a copolymer of TFE and $CF_2=CFOCF_2CF(CF_3)OCF_2CF(CF_3)SO_2F$, is a copolymer containing repeating units $$-(CF_2CF_2)_n-CF-CF_2- \qquad IV$$
$$\underset{O-CF_2CF(CF_3)OCF_2CF(CF_3)SO_2F}{|}$$

wherein n, which is at least one on average, represents the number of repeating units derived from the substantially fluorinated alkene between repeating units derived from the fluorinated vinyl ether bearing pendent ion-exchange groups (or groups convertible thereto).

In the fluoroorganic polymeric material according to the present invention, the number of repeating units derived from the perfluoroalkene: the number of repeating units derived from the perfluorocarbon vinyl ether bearing an ion-exchange group, eg n in General Structure IV, is typically between 1–16 and preferably between 2–8.

The EW of the aforementioned specific examples of fluoroorganic polymeric materials we have prepared is typically between 600 and 2000 and preferably is between 750 and 1300.

The EW of the fluoroorganic polymeric materials may be determined by titration (Titration EW), it is defined as the weight of dry polymer which will neutralise one equivalent of base. It may be determined by the procedure described in the Examples appended hereto.

According to a further aspect of the present invention there is provided an ion-exchange membrane for use in an electrochemical device, particularly a fuel-cell, which ion-exchange membrane comprises a polymeric material according to any of the aforementioned aspects of the present invention wherein the at least one ion-exchange group comprises a fixed anionic group and an associated cation.

The membrane according to the present invention preferably comprises a fluoroorganic polymeric material comprising a polymeric chain of repeating units having the structure $$-CA_2CA_2-$$

and repeating units having the structure $$-CA_2CA- \\ \underset{B}{|}$$

wherein group B has the meaning hereinbefore ascribed to it and wherein in Group B, Z is hydroxyl or O—Met wherein Met is alkali metal and X, Y and m have the meanings hereinbefore ascribed to them.

According to a yet further aspect of the present invention there is provided a process for the preparation of a fluoroorganic polymeric material according to the present invention which process comprises the step of copolymerising the fluorinated alkene and the aforementioned fluorocarbon vinyl ether bearing a group convertible into an ion-exchange group under conditions such that the EW distribution of the fluoroorganic polymeric material is more than 1.05.

The preparation of perfluoropolymers by emulsion polymerisation is known, see for example U.S. Pat. No. 3,282,855. JA 60-250009 and JA 62-288617 describe the emulsion polymerisation of mixtures of a fluoroalkene and a fluorocarbon vinyl ether bearing a group convertible into an ion-exchange group wherein a fluorine-containing emulsifying agent is used and the pressure of the fluoroalkene is kept constant and wherein certain specific conditions for the preparation of the emulsion are used, namely ultra-sound emulsification in JA 60-250009 and use of a defined emulsification device in JA 62-288617.

In the process according to the present invention the rate of addition of the substantially fluorinated alkene, eg TFE, to the emulsion is controlled such that a higher utilisation of the fluorocarbon vinyl ether bearing a group convertible into an ion-exchange group is achieved. Preferably at least 35% w/w of the fluorocarbon vinyl ether bearing a group convertible into an ion-exchange group charged to the reaction vessel is utilised.

The process according to the present invention is preferably carried out in the emulsion phase although we do not exclude the possibility that it may be carried out in solution. We have found that by varying the rate of uptake of the substantially fluorinated alkene, eg TFE, polymers having an EW distribution of greater than 1.05 and a useful range of properties as hereinbefore disclosed may be prepared.

The variation in the rate of uptake may be obtained by altering the concentration of the emulsion or preferably the pressure of the substantially fluorinated alkene in the autoclave head, or more preferably by varying the agitation of the reaction mixture, eg by altering the speed of rotation of the gas entrainment system. Preferably the uptake is varied uniformly, eg increased. Although we do not exclude the possibility that the variation may be random throughout the reaction time-scale.

In a preferred aspect of the present invention a fluoroorganic polymeric material may be prepared by copolymerising a perfluorocarbon vinyl ether of General Structure III $$CF_2=CF-(OCF_2CFX)_mOCF_2CFYSO_2Z \qquad III$$

with an at least substantially fluorinated alkene, eg chlorotrifluoroethylene, or preferably a perfluoroalkene, more preferably TFE.

In General Structure III:

Z is chlorine or preferably fluorine; and

X, Y and m have the meanings hereinbefore ascribed to them.

The process of the present invention is carried out by emulsion copolymerisation of an emulsion of a suitable monomer, preferably a monomer of General Structure III, in water as hereinafter described. Emulsification may be effected by, for example, high speed mechanical stirring of a mixture of the monomer and water or by subjecting the mixture to ultrasound. We have found that the fluoroorganic polymeric material prepared from an emulsion prepared under ultrasound has substantially the same EW distribution for a particular pressure of fluorinated alkene used in the preparation, eg TFE, as the EW distribution of a similar fluoroorganic polymeric material prepared under the same pressure from an emulsion prepared by mechanical stirring of the same mixture, although the EW of the former fluoroorganic polymeric material is higher than the EW of the latter fluoroorganic polymeric material.

It will be appreciated that the emulsifying agent used in the emulsifying step in the process according to the present invention should not contain and C—H bonds and is preferably a perfluoroalkanoate, eg ammonium perfluorononanoate, perfluorooctanoate or perfluoroheptanoate.

In the polymerisation step of the process according to the present invention, the initiator used may be any of those conventionally used for the polymerisation of such monomers, however ammonium persulphate is preferred. It will be appreciated that inter alia the molecular weight (MW) of the fluoroorganic polymeric material prepared thereby, and accordingly the physical properties of a membrane prepared from the fluoroorganic polymeric material, will be affected by inter alia the concentration of the initiator used in the polymerisation step.

Typically the concentration of the initiator in the emulsion is between 0.1% w/w and 2% w/w. The skilled man, by simple experiment, will be able to determine a suitable initiator concentration.

The emulsion polymerisation is carried out under pressure, typically 500–5000 kPa and preferably 800–2000 kPa while the emulsion is agitated to entrain the substantially fluorinated alkene therein. The polymerisation is preferably carried out in a vessel which is pressurised with the alkene at the start of the polymerisation. However, we do not exclude the possibility that the alkene may be charged to the vessel under so-called starve-feed conditions or charged continuously to thereto.

Fluorinated vinyl ethers bearing pendent ion-exchange groups or groups convertible thereto for use in the preparation of fluoroorganic polymeric material according to the present invention, for example $CF_2=CFOCF_2CF(CF_3)OCF_2CF(CF_3)SO_2F$, may be prepared by the process described in, for example, JA 52-33610.

In the process according to the present invention, it is prefered that a single at least substantially fluorinated alkene, preferably a single perfluoroalkene, is used. However, we do not exclude the possibility that a plurality of substantially fluorinated alkenes may be used.

In the process according to the present invention, it is prefered that a single perfluorocarbon vinyl ether bearing a group convertible to an ion-exchange group, eg $CF_2=CFOCF_2CF(CF_3)OCF_2CF(CF_3)SO_2F$, is used. However, we do not exclude the possibility that a plurality of such compounds may be used.

The fluoroorganic polymeric material according to the present invention is recovered from the process of preparation, typically in the form of a powder.

Membranes according to the present invention may be prepared from the aforementioned powder by methods known in the art, eg extrusion, casting from solution or preferably hot pressing a film.

After preparation of the film it may be hydrolysed to generate the ion-exchange membrane according to the present invention. However, we do not exclude the possibility that the fluoroorganic polymeric material recovered from the preparation may be hydrolysed and then cast from solution to form a film.

The membrane is in the form of a sheet or film of fluoroorganic polymeric material of thickness typically between 20 and 500 microns, and preferably between 100 and 200 microns.

The membrane of the present invention will usually be prepared from a single fluoroorganic polymeric material according to the present invention. However, we do not exclude the possibility that a homogeneous blend of two or more such fluoroorganic polymeric materials may be present in the membrane, although this is not preferred.

Where a homogeneous blend is employed, it is conveniently prepared by mixing emulsions of the fluoroorganic polymeric materials in a liquid medium and separating the blend by coagulation to afford a fluoroorganic polymeric material having EW distribution of more than 1.05.

We do not exclude the possibility that the homogeneous blend may comprise more than one, eg two, fluoroorganic polymeric materials of the same chemical composition, eg a copolymer of TFE and $CF_2=CFOCF_2CF(CF_3)OCF_2CF(CF_3)SO_2F$, but different EW's.

The membrane according to the present invention typically comprises a single film of copolymer. However, we do not exclude the possibility that it may be a laminate of two or more films although a laminated membrane is not prefered.

Membranes according to the present invention may be used as membranes in electrochemical devices, for example electrolytic cells, eg chlor-alkali cells, or particularly electrochemical devices involving proton conductivity, eg fuel cells and proton pumps.

It will be appreciated that where a membrane according to the invention is used in a fuel cell it should be hydraulically impermeable.

Fuel cells according to the present invention may be in the form of any fuel cell containing at least one membrane or solid polymer electrolyte of the present invention. There is a tendency in the art to use "membrane for fuel cell" and "solid polymer electrolyte" interchangeably and indiscriminately. Accordingly, where we use "membrane for fuel cell" it is to be understood that it includes "solid polymer electrolyte".

According to a yet further aspect of the present invention there is provided an electrochemical device, particularly a fuel cell, comprising a membrane according to the further aspect of the present invention.

The present invention is now illustrated by reference to the accompanying drawings which show by way of example only certain properties of membranes according to the present invention.

BRIEF DESCRIPTION OF THE DRAWINGS

In the drawings:

In FIG. 1, 1 is the line indicating the relationship between Specific Conductivity and EW for a fluoroorganic polymeric material according to the present invention prepared by the General Method of preparation described in Examples 1–3; 2 is the line indicating the relationship between Specific Conductivity and EW for a commercially available membrane (ex Du Pont) derived from our measurements and reported data (G A Elsman, "Proceedings of Symposium on Diaphragms, Separators and Ion Exchange Membranes", Vol 86-13. pp 156 and R S Yeo, J Electrochem Soc., 1983. Vol 130(3), pp 533); and 3 is the line indicating the relationship between Specific Conductivity and EW for a commercially available membrane (ex Dow Chemical Co) derived from data in the aforementioned references. From FIG. 1, it can be seen that for a particular EW the membranes of the present invention have higher Specific Conductivities in the practical range. ie EW 850-1200, than certain commercially available membranes.

In FIG. 2, lines 1, 2 and 3 relate to the fluoroorganic polymeric materials to which they relate in FIG. 1. From FIG. 2 it can be seen that we have obtained membranes having high Specific Conductivities and Hydration Products of more than 40,000.

In FIG. 3, lines 1, 2, and 3 relate to the fluoroorganic polymeric materials to which they relate in FIGS. 1 and 2. From FIG. 3 it can be seen that for a defined value of n the membranes according to the present invention have lower crystallinities than certain commercially available materials.

Figure 1:
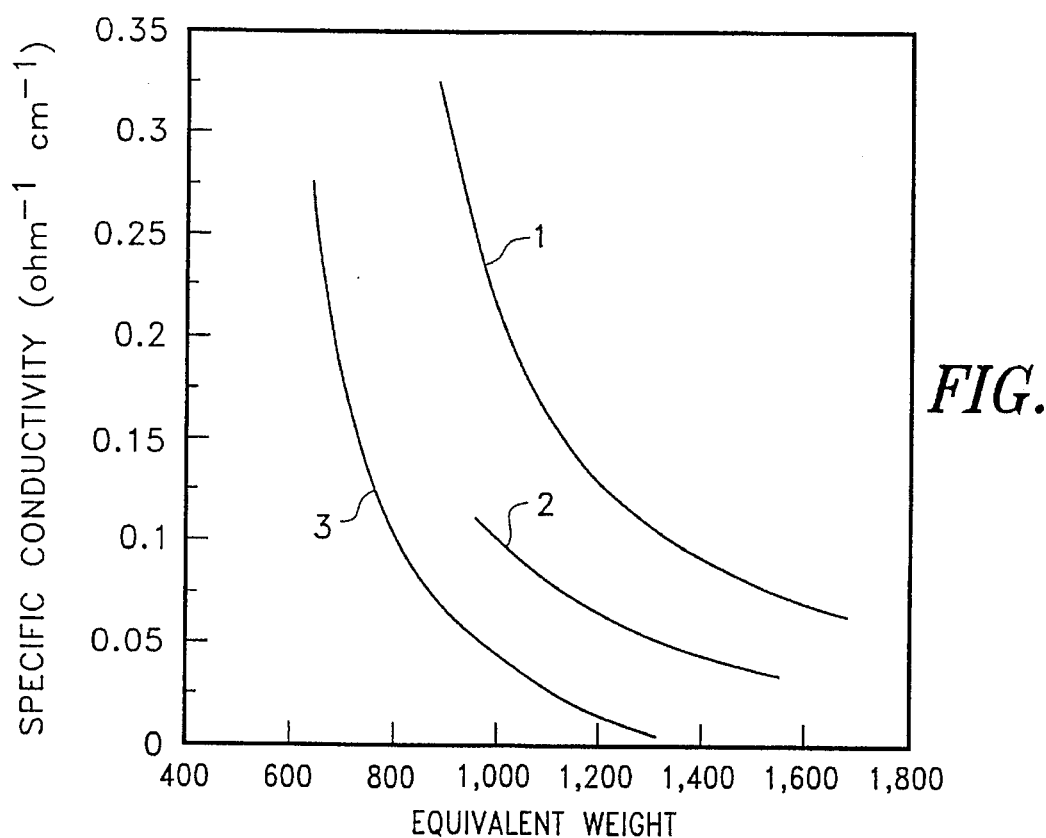
FIG. 1 is a graph illustrating the relationship between Specific Conductivity and EW of certain known perfluorinated membranes and membranes according to the present invention.
Figure 2:
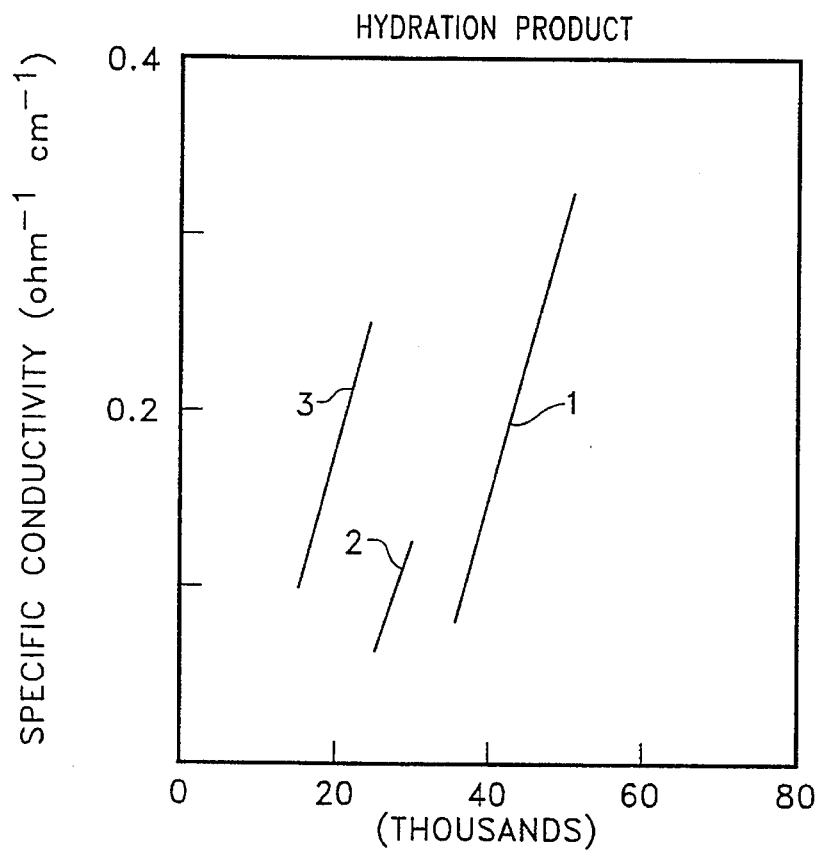
FIG. 2 is a graph illustrating the relationship between Specific Conductivity and Hydration Product for certain known membranes and membranes according to the present invention.
Figure 3:
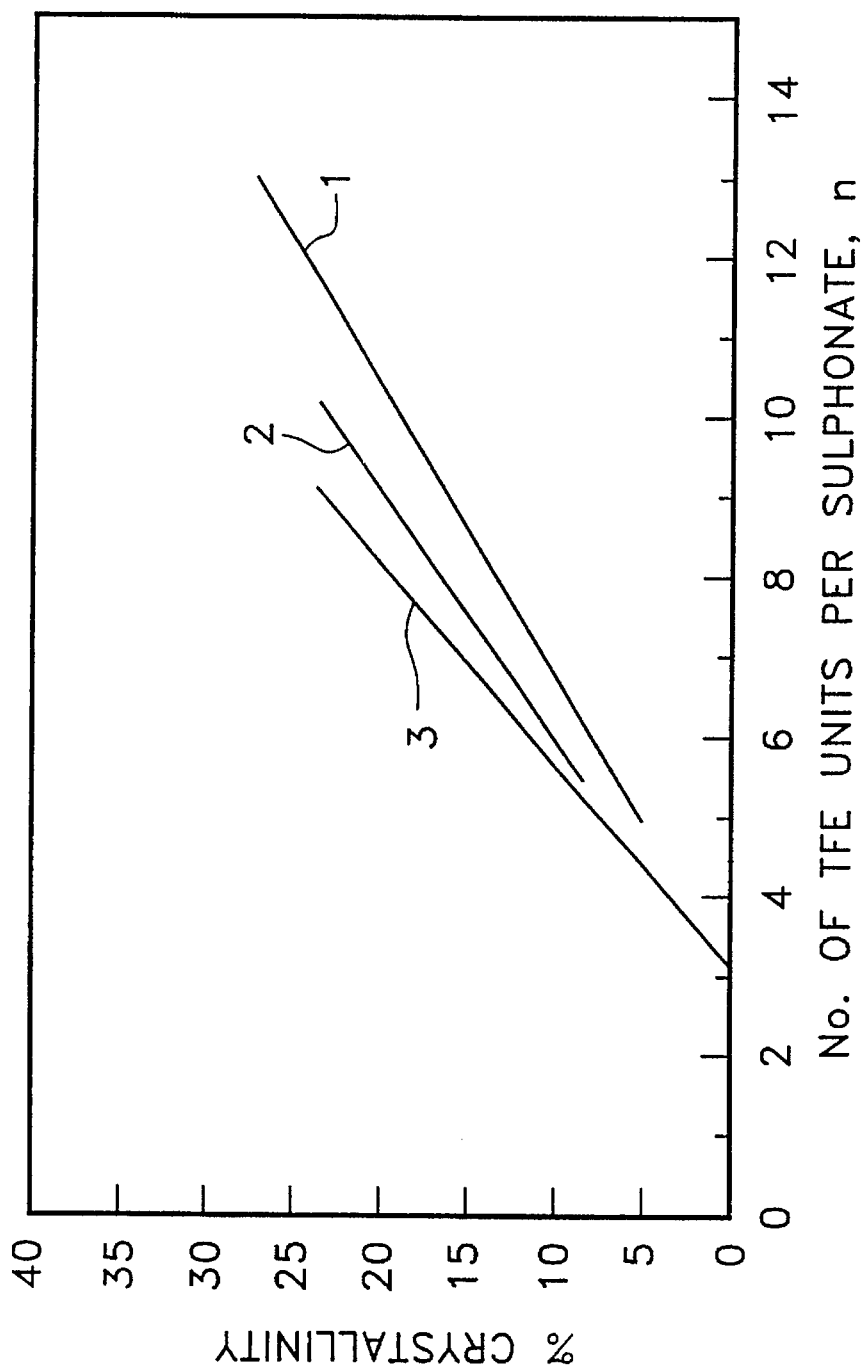
FIG. 3 is a graph illustrating the relationship between crystalline content and the TFE:pendent group ratio, ie n in General Structure IV, for fluoroorganic polymeric materials according to the present invention and certain known fluoroorganic polymeric materials.

The present invention is further illustrated by the following Examples.

In the Examples, certain properties of the fluoroorganic polymeric materials were determined by the following procedures.

Titration EW

The Titration EW of the polymer was determined by the following method. A sample of the hydrolysed film (0.5 g) was converted into the acid form by standing in 1N sulphuric acid at room temperature for 24 hours. The sample in acid form was placed in 0.1M NaOH solution (25.0cm$^3$) for 24 hours, then removed and dried to constant mass. The residual NaOH in the solution was titrated with 0.1N sulphuric acid using methyl red/methylene blue indicator.

The titration EW of the film was calculated by dividing the weight of dry polymer film by the number of equivalents of caustic soda consumed in neutralising it.

EW by NMR (NMR EW)

The $^{19}$F NMR spectra of the fluoroorganic polymeric materials were obtained on a Fourier Transform NMR (Jeol FX100) with a dedicated 5mm $^{19}$F probe and the following parameters:

| | |
|---|---|
| Observation frequency | 93.65 MHz |
| Pulse width | 15 μs |
| Number of scans | 1 |
| Temperature | 170° C. |
| External lock | |

A sample (powder or ribbon) of the fluoroorganic polymeric material was placed in a 5 mm NMR tube and heated to about 200° C. using an electric furnace. After about 5 mins the sample was rapidly transferred to the probe and the spectrum was obtained.

Where the fluoroorganic polymeric material was a copolymer of TFE and $CF_2=CFOCF_2CF(CF_3)OCF_2CF(CF_3)SO_2F$ the NMR EW was calculated by integrating the area under the NMR signal associated with the following species:

(i) the single fluorine species in the $-CF(CF_3)O-$ moiety of the pendent group; and (ii) all the $-CF_2-$ groups in the polymer backbone.

The NMR signals from species (i) occur in the range −135 to −150 ppm and the NMR signals from species (ii) occur in the range −105 to −135 ppm.

The area under the NMR signals from species (i), A1, provides a measure of the area from a single fluorine atom. Thus the area associated with the fluorine atom of the TFE moieties of the backbone (A2), is given by the equation:

$$A2 = [\text{total integrated area for species (ii)}] - 2 \times A1$$

The integration area for the TFE group in the polymer backbone (A3) is calculated from the equation:

$$A3 = (A2)/4.$$

The number of TFE units per perfluorocarbon vinyl ether bearing a group convertible into an ion-exchange group (n) is calculated from the equation:

$$n = A3/A1$$

NMR EW is defined by the equation:

$$EW = (100 \times n) + \text{molecular weight of vinyl ether monomer.}$$

Where the fluoroorganic polymeric material was a copolymer of TFE and $CF_2=CFOCF_2CF(CF_3)OCF_2CF_2SO2F$ the NMR EW was calculated by integrating the area under the NMR signal associated with the following species:

(iii) $-CF_3$ and $-CF_2O$ in the pendent group;

(iv) $-CF_2-$ in the polymer backbone, $-CF_2S$ and $-CFO$ in the pendent group.

The NMR signals from species (iii) lie in the range −70 to −90 ppm and the NMR signals from species (iv) lie in the range −105 to −150 ppm.

The area under the NMR signals from species (iii) provide a measure of the area associated with a single fluorine atom (A4).

$$A4 = [\text{integrated area for species (iii)}]/7$$

The area associated with the fluorine atoms from the TFE backbone (AS) is calculated from the equation:

A5=[integrated area for species (iv)]−6×A4

The integrated area for the TFE group in the polymer backbone (A6) is calculated from the equation:

A6=A5/4

The number of TFE units per perfluorovinyl ether bearing a pendent group convertible into an ion-exchange group (n) is calculated from the equation:

n=A6/A4

It will be appreciated that the skilled man will be able to adapt the above procedure to calcuate n for further fluoroorganic materials according to the present invention.

Crystallinities

The crystallinities of the membranes according to the present invention were determined using wide-angle X-ray scattering techniques.

The crystallinities of commercially available membranes were determined by the method of differential intensity/area measurements as descrbed by Gierke et al, J Polymer Sci, Phys Ed, 19, 1687, 1981 and Hashimoto et al, in ACS Symposium Series, 180, Edtd by Eisenburg etal, p217, (1982) and Tant et al, in ACS Symposium Series, 395, Edts Utacki et al, p370 (1984).

Hydration Products

The Hydration Products of the membranes were determined by the procedure described in the aforementioned Eisman reference.

Specific Conductivities

The Specific Conductivities of the membranes were determined by the following method.

The resistance of the membrane was measured by using small sinusoidal perturbations from zero current using a Schlumberger 1250 frequency response analyser operating at 10 mV (rms) and 1 kHz with a reference resistor of 0.82ohm. Measurements were conducted in a PTFE constructed cell consisting of two halves each fitted with an electrolyte (2.5M $H_2SO_4$) reservoir and a platinized platinum gauze electrode. The membane was inserted between the cell portions giving a constant distance between the electrodes and the membrane. During the measurement, electrolyte (maintained at 25° C.) flowed across the membrane.

Measurements of the resistance across the cell, with (R1) and without (R2) the membrane in place were made over a period of thirty minutes after an equilibrium had been attained. The resistance of the membrane was calculated by subtraction of the mean of R2 from the mean of R1. The specific resistance and thence the Specific Conductivity were calculated according to the method described in the aforementioned Elsman reference.

EXAMPLES 1–3

These Examples illustrate fluoroorganic polymeric materials and membranes according to the present invention.

General Method

Preparation of Fluoroorganic Polymeric Material

The perfluorocarbon vinyl ether bearing a group convertible into an ion-exchange group $CF_2=CFOCF_2CF(CF_3)OCF_2CF(CF_3)SO_2F$ (monomer), water (110 g ) and ammonium perfluorooctanoate ((0.5 g) were charged to a bottle and subjected to ultrasound in a Kerry Ultrasonic Bath, type PUL 125 for 1–3 hours until emulsification had been effected. The emulsion was then charged to a 0.4 litre autoclave under a nitrogen atmosphere.

The nitrogen in the autoclave containing the emulsion was replaced by TFE at about atmospheric pressure. The temperature of the autoclave was raised to 70° C. and then the TFE pressure was raised to the values indicated in Table 1. A solution (10 ml) of ammonium persulphate (7.5 g/500 ml) was added to the reaction mixture.

The reaction mixture was stirred at constant speed. (Except Example 3, the stirrer speed was reduced after 5 minutes from 750 to 500 rpm.)

The reaction was monitored by observing the pressure drop until the desired amount of TFE had been absorbed. Excess TFE was vented and the reaction mixture was allowed to cool to room temperature.

The emulsion was decanted from any unreacted monomer and was broken by freezing overnight. The fluoroorganic polymeric material was recovered by filtration and dried in vacuum at 80° C.

The reaction conditions are shown in Table 1.

TABLE 1

| Ex No. | Initial wt of monomer (g) | Initial TFE pressure (kPa) | Initial Stirrer speed (rpm) | Pressure Drop 5 Mins Intervals (kpa) | Pressure Drop Total (kPa) | Reaction Time (mins) |
|---|---|---|---|---|---|---|
| 1 | 20 | 1600 | 700 | 44, 40, 49, 58, 71, | 300 | 27.5 |
| 2 | 10.4 | 1200 | 750 | 3, 8, 11, 15, 17, 20, 24, 22, 25, 26, 27 | 200 | 55.5 |
| 3 | 10.5 | 1400 | 750 500 | 89 59, 46 | 300 | 16.0 |

Preparation of Membrane

The melt flow index (MFI) of the fluoroorganic polymeric material was determined by the method of BS 2782, 720A/ASTM D1238-79.

Organic fluoropolymeric material powder was pressed at a temperature at which a flow thereof of about 10–100 g/10 mins was obtained in MFI tests. Pressing of the powder was carried out at 60 tons acting on 6 inch ram in an aluminium former between polyimide sheets on stainless steel plates.

Hydrolysis

Conversion of the sulphonyl fluoride groups in the fluoroorganic polymeric material in the pressed film into the sodium sulphonate derivative thereof was effected by treatment with NaOH solution at high temperature.

A sample of the film in 20% NaOH in water was heated at 90° C. for 17 hours. Hydrolysis was monitored by infra-red analysis. Hydrolysis was judged to be complete when the peak at 1468 cm$^{-1}$ attributable to the $SO_2F$ group was not detectable.

The weight percentage of the charge of monomer used in Examples 1–3, the yield of fluoroorganic polymeric material and certain properties of membranes prepared therefrom are shown in Table 2.

TABLE 2

| Example No. | Yield (g) | Monomer Used (%) | TEW | EWD | SC | RHP | CP |
|---|---|---|---|---|---|---|---|
| 1 | 18.42 | 41 | 1100 | 1.34 | 0.55 | 15 | 8.2 |
| 2 | 11.42 | 42 | 1290 | 1.29 | 0.28 | 32 | 6.3 |
| 3 | 8.5 | 40 | 980 | 1.23 | 0.51 | 60 | 5.5 |

TEW: Titration EW (g/equ)
EWD: Equivalent Weight Distribution
SP: Specific Conductivity (ohm$^{-1}$cm$^{-1}$)
RHP: Relative Hydration Product
CP: Conductivity Product (ohm$^{-1}$cm$^{-1}$)

EXAMPLE 4–11

These Examples illustrate further fluoroorganic polymeric materials and membranes according to the present invention.

General Method

Copolymer Preparation

Method A

The perfluorocarbon vinyl ether bearing an ion-exchange group $CF_2{=}CFOCF_2CF(CF_3)OCF_2CF(CF_3)SO_2F$, water (110 g) and ammonium perfluorooctanoate ((0.5 g) were charmed to a 0.4 litre autoclave and stirred overnight at room temperature under an atmosphere of nitrogen to effect emulsification.

Method B

The perfluorocarbon vinyl ether $CF_2{=}CFOCF_2CF(CF_3)OCF_2CF(CF_3)SO_2F$, water (110 g) and ammonium perfluorooctanoate ((0.5 g) were charged to a bottle and subjected to ultrasound for 1–3 hours until emulsification had been effected. The emulsion was then charged to a 0.4 litre autoclave under a nitrogen atmosphere.

The emulsions in the autoclaves from Method A or B were polymerised under the general conditions used for Examples 1–2.

The MFI's, Ion Exchange Coefficient (IEC), crystallinities and Specific Conductivities of the fluoroorganic polymeric materials were determined, and membranes prepared therefrom, by the methods described in Examples 1–3.

Table 3 indicates the specific conditions under which the fluoroorganic polymeric materials were prepared in Examples 4–11 and Table 4 indicates the conditions under which membranes were prepared from those materials and certain properties of the membranes.

TABLE 3

| Example No. | Method | Monomer Used (g) | Pressure TFE (kPa) | TFE pressure drop (kPa) | Polymer Yield (g) |
|---|---|---|---|---|---|
| 4 | A | 20.0 | 8200 | 300 | 12.2 |
| 5 | B | " | 1120 | 300 | 19.7 |
| 6 | A | " | 1100 | 300 | 11.1 |
| 7 | B | 10.1 | 1100 | 200 | 12.1 |
| 8 | B | 20.1 | 1100 | 410 | 23.1 |
| 9 | B | 20.0 | 1400 | 300 | 14.5 |
| 10 | A | " | 1400 | 300 | 12.9 |
| 11 | B | " | 1700 | 300 | 14.9 |

Method A: Emulsion prepared by mechanical mixing.
Method B: Emulsion prepared by ultrasound irradiation.

TABLE 4

| Example No. | MFI | TEW | EWD | SC | CP | RHP |
|---|---|---|---|---|---|---|
| 4 | 24/200 | 1130 | 1.38 | ND | ND | ND |
| 5 | 7.5/110 | 850 | 1.08 | 0.27 | 1.8 | 79 |
| 6 | 6/200 | 1320 | 1.48 | 0.08 | 1.9 | 108 |
| 7 | 42/170 | 1020 | 1.15 | 0.17 | 2.0 | ND |
| 8 | 24/140 | 1060 | 1.27 | 0.26 | 3.5 | 95 |
| 9 | 6/140 | 1180 | 1.37 | 0.16 | 3.0 | 91 |
| 10 | 42/260 | 1600 | 1.78 | ND | ND | ND |
| 11 | 1.2/170 | 1300 | 1.63 | ND | ND | ND |

ND: Not determined.
MFI: Melt flow index (g/10 mins)/(°C.)
TEW: Titration EW (g/equ)
EWD: Equivalent weight distribution
SC: Specific Conductivity (ohm$^{-1}$cm$^{-1}$)

From Tables 3 and 4, particularly comparison of Examples 5 and 9 with Examples 6 and 10, it can be seen that fluoroorganic polymeric materials prepared under the same polymerisation conditions but different emulsification conditions have EW distibutions greater than 1.05, although the method of emulsification affects the EW of the fluoroorganic polymeric material.

EXAMPLES 12–13

These Examples illustrate yet further fluoroorganic polymeric materials according to the present invention.

The perfluorocarbon vinyl ether bearing a group convertible into an ion exchange group $CF_2{=}CFOCF_2CF(CF_3)OCF_2CF_2SO_2F$, water (2600 g), and ammonium perfluorooctanoate (10.4 g) were charged to a 5-litre autoclave and stirred overnight at room temperature under nitrogen to effect emulsification.

Nitrogen was replaced by TFE at about atmospheric pressure and the temperature of the autoclave was raised to 71° C. A solution of ammonium persulphate was added to afford a 0.1% w/w concentration thereof in the aqueous phase and the autoclave was pressurised with TFE.

The reaction mixture was stirred at 750 rpm until the desired amount of TFE had been taken up as indicated by monitoring the pressure drop. The reaction conditions are shown in Table 5.

TABLE 5

| Example No. | Monomer Used (g) | Initial TFE Pressure (kPa) | Accumulated pressure drop (kPa) | Yield (g) |
|---|---|---|---|---|
| 12 | 250 | 610 | 1380 | 291 |
| 13 | 450 | 450 | 2850 | 602 |

The emulsion was decanted from any unreacted monomer and was broken by freezing overnight. The fluoroorganic polymeric material was recovered by filtration and dried in vacuo at 80° C.

Membranes were prepared from the fluoroorganic polymeric material by the procedure described in Examples 1–3. The physical properties of the membranes prepared therefrom are shown in Table 6.

TABLE 6

| Example No. | MFI | TEW | EWD | SC | CP | HP |
|---|---|---|---|---|---|---|
| 12 | 24/170 | 950 | 1.12 | 0.39 | 4.4 | 42800 |
| 13 | 18/170 | 1000 | 1.06 | 0.48 | 5.1 | 40100 |
| CT | not determined | 1070 | not determined | 0.11 | 1.7 | 31800 |

MFI: Melt flow index (g/10 min/°C.)
TEW: Titration EW
SC: Specific Conductivity (ohm$^{-1}$cm$^{-1}$)
CP: Conductivity Product (ohm$^{-1}$cm$^{-1}$)
HP: Hydration Product
CT: Comparativer Test (Nafion 117; ex Aldrich Chemical Company; the above values are in good agreement with published data, eg Yeo & Yeager in Modern Aspects of Electrochemistry, 16 (1985), 437–504.)

From Table 6 it can be seen that the Specific Conductivities of fluoroorganic polymeric materials according to the present invention are higher than a commercially available material.

EXAMPLE 14

This example illustrates a fluoroorganic polymeric material according to the present invention prepared by homogeneous blending.

Emulsions of fluoroorganic polymeric materials comprising copolymers of TFE and $CF_2=CF-OCF_2CF(CF_3)OCF_2CF_2SO_2F$ having EW's of 1230 and 940 were prepared by the procedures described in Examples 1 and 2 respectively of our aforementioned EP 0,345,964. The emulsions can be mixed and the mixture of emulsions can be cooled to about −30° C. to coagulate a homogeneous blend of the fluoroorganic polymeric materials. The homogeneous blend thereof having an EW distribution of more than 1.05 can be filtered off.

EXAMPLE 15

This Example illustrates a fuel cell according to the present invention.

A sample of the membrane prepared from the polymer prepared in Example 12 was used as the solid polymer electrolyte in a fuel cell as outlined in P D Naylor et al, Power Sources, Vol 13, 1991, 253–261, at 60° C. with oxygen and hydrogen at 220 kPa and 1:1 stoichiometry. At a cell voltage of 0.1 volts the current density was 900mA cm$^{-2}$.

In a Comparative Test, commercially available Nafion 117 was used instead of the aforementioned membrane.

The results are shown in Table 7 from which it can be seen that the relative performance of the membrane according to the present invention was better than a commercially available membrane as determined by current density measurements.

It will be appreciated that such an increase in current density would allow a fuel cell to provide more power from a given electrolyte area or, alternatively, a fuel cell of a given power output would be smaller if a polymer according to the present invention replaced Nafion 117.

TABLE 7

| Cell Voltage (v) | Current Density Ratio (Example 12/Nafion 117) |
|---|---|
| 1.0 | 1.0 |
| 0.7 | 1.0 |
| 0.5 | 1.38 |
| 0.4 | 1.57 |
| 0.3 | 1.62 |
| 0.2 | 1.67 |
| 0.1 | 1.70 |

We claim:

1. A fluoroorganic polymeric material which is derived from a substantially fluorinated alkene and a perfluorocarbon vinyl ether and comprises a polymeric chain and at least one group pendent from the polymeric chain, in which the group pendent from the polymeric chain is derived from a perfluorovinyl ether and comprises at least one sulphonate group or group convertible thereto and an acyclic secondary carbon atom, and in which the sulphonate group or group convertible thereto is directly linked to the acyclic secondary carbon atom.

2. A fluoroorganic polymeric material as claimed in claim 1 wherein the at least one ion-exchange group comprises fixed anionic groups and associated cations.

3. A fluoroorganic polymeric material as claimed in claim 1 comprising a polymeric chain of repeating units having the structure $$-CA_2CA_2-$$

and repeating units having the structure $$-CA_2CA-$$
$$\phantom{-CA_2C}|$$
$$\phantom{-CA_2C}B$$

wherein

A, each of which may be the same or different, is halogen or an alkyl group bearing halogen substituents; and B is a group which comprises an ion-exchange group, or group convertible thereto.

4. A fuel cell comprising at least one anode, at least one cathode and a fluoroorganic polymeric material as claimed in claim 1.

5. A fluoroorganic polymeric material which is derived from a substantially fluorinated alkene and a perfluorocarbon vinyl ether and comprises a polymeric chain of repeating units having the structure $$-CA_2CH_2- \qquad I$$

and repeating units having the structure $$-CA_2CA- \qquad II$$
$$\phantom{-CA_2C}|$$
$$\phantom{-CA_2C}B$$

wherein II is the residue of a perfluorovinyl ether and wherein

A, each of which may be the same or different, is halogen or an alkyl group bearing halogen substituents; and B, is a group which comprises an acyclic secondary carbon atom and a sulphonate group, or group convertible thereto, and in which the sulphonate group or a group convertible thereto is directly linked to the acyclic secondary carbon atom.

6. A fluoroorganic polymeric material as claimed in claim 5 in which the group B has the structure:

−D−OCF$_2$CFSO$_2$Z wherein

D is a direct link or a divalent group;

Y is an at least substantially fluorinated alkyl group having up to 10 carbon atoms;

Z is fluorine, chlorine, a hydroxyl group, or a group having the formula —O—Met, where Met is an alkali metal, a substituted or unsubstituted ammonium group, or an alkyl group.

7. A fluoroorganic polymeric material as claimed in claim 6 wherein D has the structure

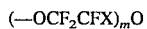
(—OCF$_2$CFX)$_m$O      I wherein

X, which in the same pendent group of General Structure I when m is 2 or more or in different pendent groups may be the same or different, is F or Y; and m is 0–5.

8. A fluoroorganic polymeric material as claimed in claim 7 wherein X is F.

9. A process for the preparation of a fluoroorganic polymeric material which comprises the step of copolymerising a perfluorocarbon vinyl ether CF$_2$=CF—(OCF$_2$CFX)$_m$OCF$_2$ CFYSO$_2$Z wherein Z is chlorine or preferably fluorine;

Y is an at least substantially fluorinated alkyl group having up to 10 carbon atoms; and X and m have the meanings ascribed to them in claim 7.

10. A process as claimed in claim 9 carried out under emulsion polymerisation conditions.

11. A process as claimed in claim 10 wherein the rate of uptake of the substantially fluorinated alkene is varied.

12. A process as claimed in claim 11 wherein the pressure of the substantially fluorinated alkene is varied.

13. A process as claimed in claim 9 wherein the at least substantially fluorinated alkene is perfluoroalkene.

14. An ion-exchange membrane for use in an electrochemical device which membrane comprises a fluoroorganic polymeric material according to claim 6 wherein in the ion-exchange group —SO$_2$Z, Z is hydroxyl or O—Met wherein Met is alkali metal.

15. A fluoroorganic polymeric material as claimed in claims 1 or 5 which is a perfluoroorganic polymeric material.

16. An ion-exchange membrane for use in an electrochemical device which membrane comprises a fluoroorganic polymeric material according to claims 1 or 5 wherein the group pendent from the polymeric chain comprises at least one ion-exchange group.

17. An electrochemical device comprising at least one anode and at least one cathode wherein each anode and adjacent cathode are separated by an ion-exchange membrane as claimed in claim 16.

* * * * *